United States Patent
Brown et al.

(10) Patent No.: US 7,830,790 B2
(45) Date of Patent: Nov. 9, 2010

(54) METHOD FOR SELECTING PACKETS IN A DATA TRANSMISSION NETWORK

(75) Inventors: Patrick Brown, Cagnes sur Mer (FR); Urtzi Ayesta, Antibes Juan les Pins (FR); Konstantin Avratchenkov, Juan les Pins (FR); Eeva Nyberg, Helsinki (FI)

(73) Assignee: France Telecom, Paris (FR)

( * ) Notice: Subject to any disclaimer, the term of this patent is extended or adjusted under 35 U.S.C. 154(b) by 835 days.

(21) Appl. No.: 10/586,390

(22) PCT Filed: Jan. 16, 2004

(86) PCT No.: PCT/FR2004/000094
§ 371 (c)(1),
(2), (4) Date: Oct. 17, 2006

(87) PCT Pub. No.: WO2005/079019
PCT Pub. Date: Aug. 25, 2005

(65) Prior Publication Data
US 2007/0165528 A1    Jul. 19, 2007

(51) Int. Cl.
H04L 12/26    (2006.01)
(52) U.S. Cl. ........................ 370/229; 370/235
(58) Field of Classification Search ................. 370/235
See application file for complete search history.

(56) References Cited

U.S. PATENT DOCUMENTS 5,617,561 A * 4/1997 Blaauw et al. ............... 703/26
2003/0043802 A1   3/2003 Kanada et al.

OTHER PUBLICATIONS

Estan, Christian and George Varghese. "New Directions in Traffic Measurement and Accounting" SIGCOMM'02 Aug. 19-23, 2002, Pittsuburgh, PA.*

Defense Advanced Research Projects Agency Information Sciences Institute University of Southern California: "RFC: 793, Transmission Control Protocol DARPA Internet Program Protocol Specification" Internet Article, Sep. 1981, XP015006775.

Estan C; Varghese G, Dept. of Comput. Sci. & Eng., California Univ., San Diego, CA; USA: "New directions in traffic measurement and accounting: focusing on the elephants, ignoring the mice" ACM Transactions on Computer Systems, 'Online!, vol. 21, No. 3, Aug. 2003, pp. 270-313, XP002298877 ISSN: 0734-2071 Retrieved from the Internet: URL: http://delivery.acm.org/10.1145/860000/859719/p270-estan.pdf?key1=859719&key2=5712266901&coll=portal&dl=ACM&CFID=3957717&CFTOKEN=38351001> 'retrieved on Oct. 1, 2004! abstract.

(Continued)

Primary Examiner—Jason E Mattis
Assistant Examiner—Stephen J Clawson
(74) Attorney, Agent, or Firm—Young & Thompson

(57) ABSTRACT

A method for selection by a downstream device of data packets of connections of a network transmitted by at least one upstream device according to a predetermined threshold for quantities of data transmitted by the connections includes: for each connection, initialization by each upstream device of a counter for packets transmitted according to a set of predetermined initial values, with the difference between two initial consecutive values greater than the threshold, then incrementation by a predetermined value for each transmitted packet, defining the current counting value of the packet; reception by the downstream device of each IP packet of each connection, and comparison of the threshold with the difference between the current counting value and the initial value immediately lower than the set of initial values, enabling selection of packets for connections that have transmitted less data than the threshold, compared to packets for connections that have transmitted more.

14 Claims, 3 Drawing Sheets

OTHER PUBLICATIONS

Figure 1:
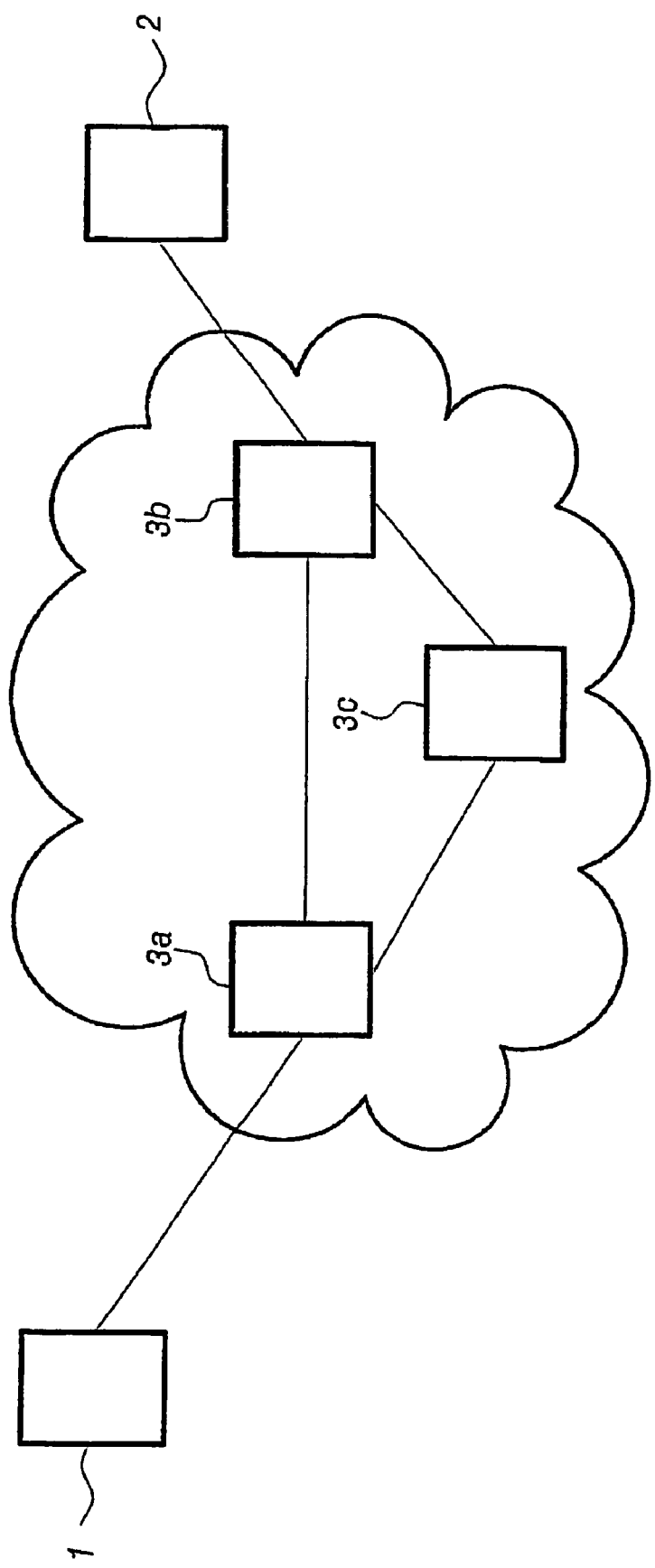

N. Brownlee; The University of Auckland; C. Mills; GTE Laboratories, Inc; G. Ruth; GTE Internetworking: "RFC 2722, Traffic Flow Measurement: Architecture" Internet Article, Oct. 1999, XP015008505.

* cited by examiner

METHOD FOR SELECTING PACKETS IN A DATA TRANSMISSION NETWORK

BACKGROUND OF THE INVENTION

This invention relates to the transmission of information in a data packet transmission network of the TCP/IP type and more particularly the handling of TCP/IP packets.

DESCRIPTION OF THE RELATED ART

It is well known that the transmission of information on the Internet using the TCP/IP protocol takes place in the form of a transmission of packets or datagram of specified standard format. Connection between a transmitting equipment and a receiving equipment is therefore characterised by a succession of packet exchanges whose function is first to initialise the connection and then transmit the data exchanged.

However these packets are routed in a variable way depending upon the load on the network. As a consequence packets which have been transmitted before others may be received after them.

In order to permit the receiving equipment to know the order in which the packets were transmitted and therefore the logical order of the data which they contain, the TCP/IP protocols provide that each TCP/IP packet contains a sequence number or count value in its header block.

As a general rule this value is initialised by the transmitting equipment at the start of the connection a random value for security purposes so that third parties cannot without difficulty break into the exchange simulating the creation of "authentic" packets. This number is then incremented by the numeric value 1 or the number of bits of data transmitted in the packet whenever a new packet is transmitted.

In addition to this the problem of optimising the network's resources to the load upon it and therefore increasing the performance of the equipment processing the packets such as, for example, routers, regularly arises.

Various investigations have demonstrated that by allowing small items of work to be processed with priority over long items of work in a system with a limited resource, such as an IT system, a router or a data transmission link, the average performance of the system can be greatly improved in comparison with other forms of handling.

The question arising is therefore to distinguish between small items of work and long items. Now at the present time this has proved to be virtually impossible while processing is in progress.

One relatively effective approximation therefore consists of giving priority treatment to items of work which have received the least attention, for example, which have taken up the least calculation time.

In the case of data transmissions this is tantamount to considering that connections which have been processed for the longest time without being terminated are on average longer than others.

Investigations have in fact shown that in the case of the Internet, one effective optimisation parameter has been the volume of information transmitted, or its equivalent, the number of packets transmitted; a file whose transmission is not always completed after the transmission of a volume X will on average be longer than a file which is not always terminated after the transmission of a volume x, where x is smaller than X.

Various mechanisms have been put forward to make use of this property in order to improve the average performance of a system. Application of a priority handling mechanism is based on handling of the volumes already transmitted by the connections. This is carried out through the use of counters, one per connection, which store the volumes of data already transmitted in memory and make a comparison between them or with a predetermined value in order to allocate processing priorities.

These systems have the disadvantage that they need storage capacity so that one counter can be installed per connection, and powerful information processing facilities because when each packet arrives the corresponding counter has to be updated, or created in the case of a new connection, compared to determine the priority which has to be allocated to that packet and, when the connection is completed (an event which it is often difficult to determine), the counter has to be closed down.

SUMMARY OF THE INVENTION

The object of the invention is therefore to overcome these disadvantages by offering a mechanism which is simple and quick to implement.

The subject matter of the invention is therefore a method for the selection by a downstream device of data packets of connections of a network transmitted by at least one upstream device in relation to a predetermined threshold of the quantities of data transmitted by these connections, this method comprising at the start of each connection, initialisation of a transmitted packets counter by each upstream device to an initial count value, incrementing the said counter by a specified value for each packet transmitted, defining the current count value of the packet, and copying this current count value into the packet header block by the upstream device, reception by the downstream device of each IP packet of each connection, characterised in that the method comprises:

selecting the initial count value at the upstream device from a set of predetermined initial values such that the difference between two consecutive initial values in that set is greater than the predetermined threshold, and comparing the predetermined threshold in the downstream device with the difference between the current count value and the immediately lower initial value in the set of predetermined initial values, as a result of which the packets corresponding to the connections which have transmitted less data than the predetermined threshold can be selected in preference to the packets corresponding to connections which have transmitted more data than the predetermined threshold.

According to the invention, when the current count value is presented in the binary form of a recording of N bits, the set of initial count values is such that a field of L bits of the count value, L always being less than N, is systematically initialised to zero, this field being positioned in such a way that when the number of transmitted packets reaches the predetermined threshold at least one bit in this field takes the numeric value 1.

According to the invention, if the field of L bits is positioned between a bit of rank M and a bit of rank M+L in the count value, the initial count values will be greater than $2^{L+M}$.

According to the invention, the predetermined threshold is equal to $2^M-1$.

According to the invention, the initial count values are multiples of $2^{L+M}$.

According to the invention, the bits of low weight in the initial count values are selected randomly from the bits of rank below T, T always being less than M.

According to the invention, the number of bits of low weight T is the whole part of the base 2 logarithm of the maximum packet size permitted on the network.

According to the invention, the comparison by the downstream equipment is a comparison between the field of L bits and the numeric value 0.

According to the invention, for the packets corresponding to connections having quantities of transmitted data which are less than the predetermined threshold, it comprises allocating them a processing priority which is higher than the packets corresponding to connections having quantities of transmitted data which are greater than the predetermined threshold.

The invention further relates to a system for generating connection of a network data packets, in an upstream device connected to the network, comprising means for the transmission of packets connected to the network, these transmission means being connected to an information processing unit and information storage means comprising at least one register capable of storing the number of transmitted packets, the information processing unit comprising means for initialising this register to an initial count value at the start of the connection and means for incrementing the contents of this register whenever a new packet is created and means for copying this register into a current count value field in the packet header block, characterised in that the initialisation means comprise means for selecting the initial count value of each connection from a set of predetermined initial values such that the difference between two consecutive initial values in that set is greater than a predetermined threshold.

According to the invention, if the current count value is in the binary form of a recording of N bits, the set of initial count values is such that a field of L bits of the count value, where L is always smaller than N, is systematically initialised to zero.

According to the invention, the incrementing means comprise means for setting at least one bit in the field of L bits to the numeric value of 1 when the number of packets transmitted exceeds the predetermined threshold.

According to the invention, if the field of L bits is positioned between a bit of rank M and a bit of rank M+L of the count value, the initial count values are greater than $2^{L+M}$.

According to the invention, the predetermined threshold is equal to $2^M-1$.

According to the invention, the initial count values are multiples of $2^{L+M}$.

According to the invention, the means for selecting the initial count values comprise means for random selection of the low weight bits of the initial count values from the bits of rank lower than T, T always being smaller than M.

According to the invention, the number of low weight bits T is the whole part of the base 2 logarithm of the maximum packet size permitted on the network.

The invention further relates to a system for the transmission of data packets from at least one connection of a network comprising receiving means for packets originating from upstream device and packet transmission means connected to information processing means, each packet having a current count value in its header block, characterised in that the information processing means also comprise a table of initial count values and means for calculating the difference between the current count value of the packet received and the initial value in the table immediately below that current count value and means for comparing this difference with a predetermined threshold.

According to the invention, the means for calculating the difference and comparison with the predetermined threshold make a comparison between a field of L bits of the current count value and zero.

According to the invention, the information processing and transmission means give priority in processing to the packets corresponding to connections having quantities of transmitted data which are less than the predetermined threshold over packets corresponding to connections having quantities of transmitted data greater than the predetermined threshold.

BRIEF DESCRIPTION OF THE INVENTION

Figure 2:
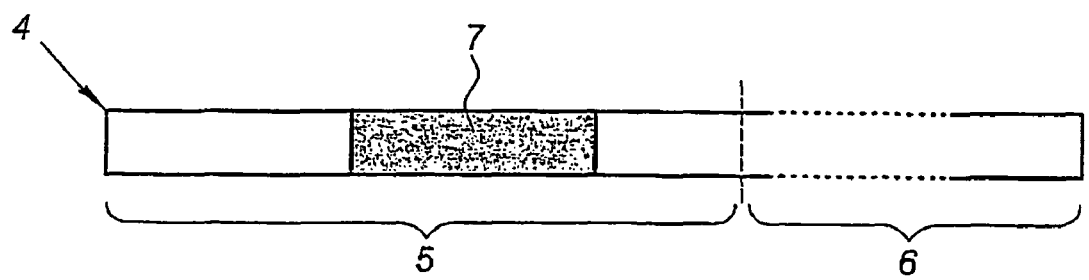
Figure 3:
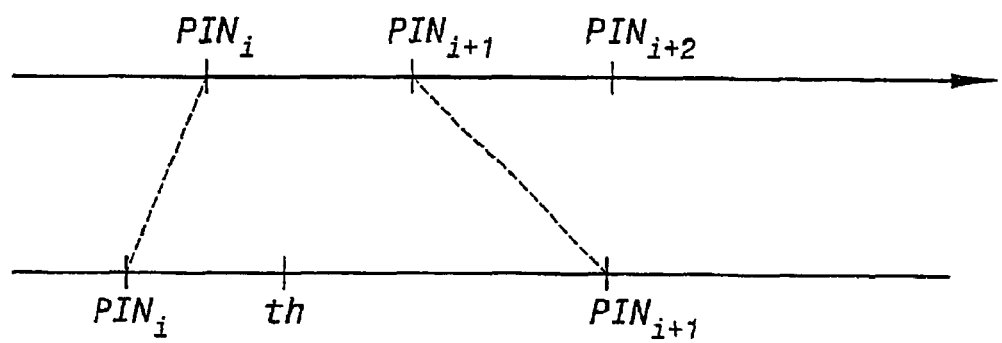
Figure 4:
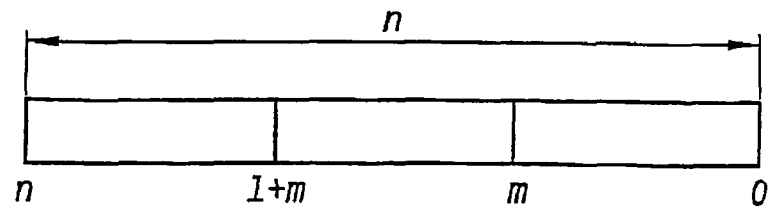
Figure 5:
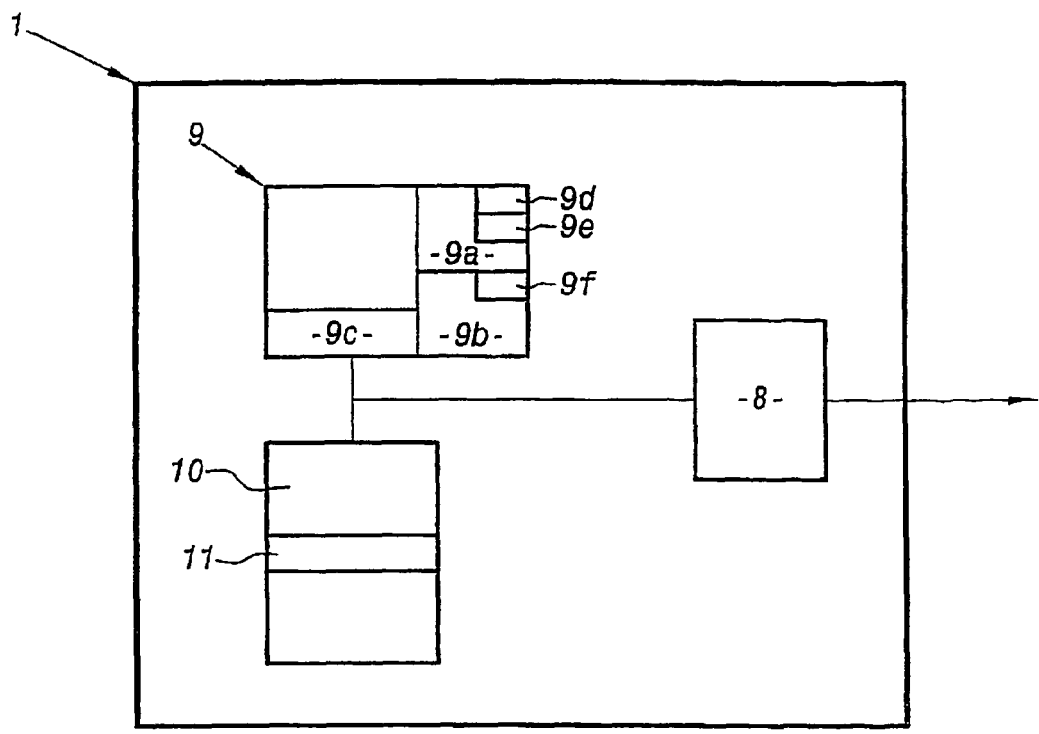
Figure 6:
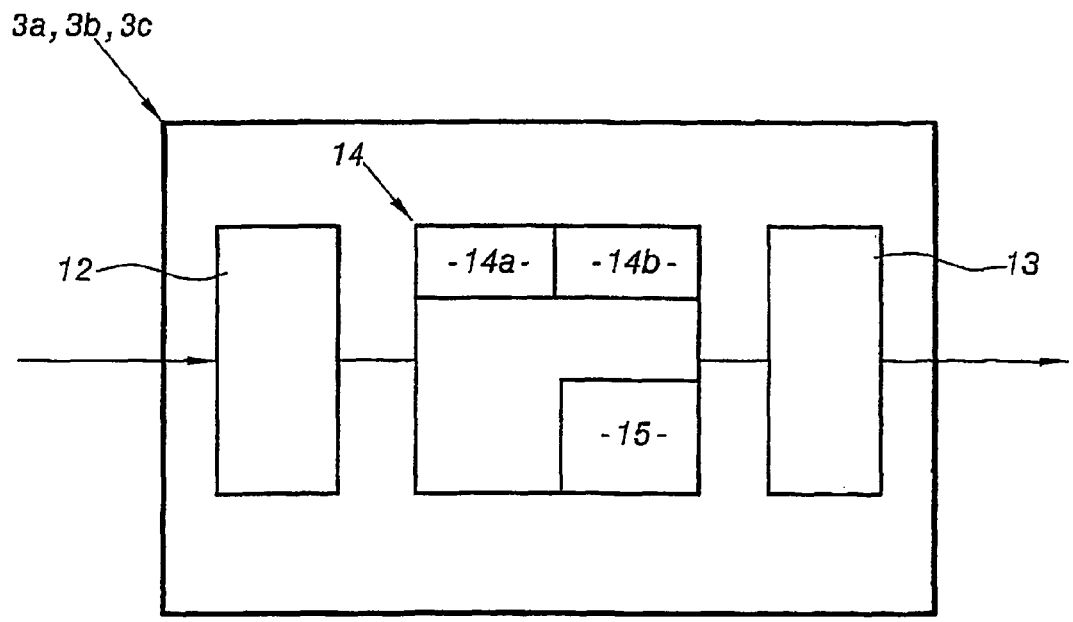

The invention will be better understood from a reading of the following description provided by way of example with reference to the appended drawings in which:

FIG. 1 shows an overall diagram of a TCP/IP network,

FIG. 2 shows a simplified diagram of a TCP packet header block according to the standard, FIG. 3 shows a symbolic diagram of the distribution of initial values according to the invention, FIG. 4 shows a diagram of the count value according to the invention in a binary representation, FIG. 5 shows a diagram of an upstream packet generation system, FIG. 6 shows a diagram of a downstream packet transmission system.

DESCRIPTION OF THE PREFERRED EMBODIMENTS

In a TCP/IP network like the Internet, FIG. 1, upstream computers 1 establish connections with computers 2 through the intermediary of network equipment such as routers 3a, 3b, 3c whose function is to route the packets constituting the connection between computers 1 and 2. Network equipment 3a, 3b, 3c will be referred to as downstream equipment in the remainder of the description.

A packet or datagram, FIG. 2, comprises a header block 5 comprising the predetermined fields which are necessary for satisfactory routing of this packet such as, for example, the address of the transmitting computer and that of the receiving computer, and the data 6 transmitted.

Among the many fields in header block 5 there is a counting field 7. This is generated by the transmitting equipment from an initial count value by incrementing this by either one unit per packet transmitted or the number of bits of data transmitted since the start of the connection.

Receiving equipment 2 can therefore check that it has correctly received all the data and put them back into order if necessary.

In the implementation of the method according to the invention described here, the initial count value is selected randomly from a restricted predefined number of count values $PIN_1$, $PIN_2$, ..., $PIN_n$, thus constituting a set of predetermined initial values.

As explained below, the difference between two consecutive initial values must be very much greater than the predetermined threshold value "th" which is used to distinguish the packets.

This list of initial count values is also known by the downstream equipment. Thus when a packet arrives the downstream equipment estimates the volume transmitted by the connection by taking the difference between the count value for the packet and the initial count value in the list immediately beneath it.

If the volume so estimated is less than the predetermined threshold value "th" the packet forms part of a short connection and therefore receives high priority, otherwise it forms part of a "long" connection and then receives a low priority.

It is worthwhile noting that if the connection is sufficiently long the current count value can reach and exceed the initial count value $PIN_{i+1}$ which is immediately above the initial count value $PIN_i$ in the list used to start the connection. Because of this the downstream equipment then calculates the difference between the current count value and $PIN_{i+1}$ and not $PIN_i$, which has the effect of incorrectly classifying the packet as belonging to a short connection, and this will continue as long as this new difference is not greater than the predetermined value th.

This incorrect classification has in fact little impact on the function of priority management. In fact the distribution of connection volumes follows a Pareto law. Thus 80% of the volume is generated by 20% of connections. By judiciously setting the predetermined threshold, these 20% or less will be regarded as long connections.

On the other hand the error does not occur when a number of packets equal to or greater than $PIN_{i+1}-PIN_i$ have already been transmitted, a difference which is very much greater than the threshold value predetermined by judicious choice of these initial count values.

As a consequence packets which are incorrectly classified are doubly rare: they belong to rare connections and they represent a small proportion of the packets transmitted by these connections.

The invention thus advantageously makes it possible to sort packets in relation to the volume transmitted by the corresponding connection without having to operate a counter specific to that connection in each downstream equipment.

A variant implementation of the invention comprises selecting the initial count values so that a zone of L bits of the counter is always initialised to zero.

In order to do this, FIG. 4, the counter and its associated values may be represented in the form of a field of N bits and may therefore take $2^N$ separate values.

Furthermore, the predetermined threshold value "th" is selected to be equal to a power of 2 minus the numeric value 1, that is $2^M-1$. In binary representation "th" has the bit in the M position set to zero and the other bits of lighter weight set to unity.

As an assumption, the predetermined threshold value "th" is very much lower than the maximum possible value for the counter, that is 2N.

As explained above, the initial count values must also be very much greater than th. As an assumption it is therefore possible to select them to be greater than $2^{L+M}$ and such that the field between the bit of weight M and the bit of weight L+M−1 is initialised to zero. These are selected preferentially from the multiples of $2^{L+M}$.

Thus in the course of the method of incrementing the count value at least one of the field bits $[2^M, 2^{L+M}]$ is set to the numeric value 1 when the predetermined threshold value is reached.

Thus the difference operation performed by the downstream equipment takes the form of a comparison with zero in the corresponding field to determine whether the packet belongs to a short or a long connection, without it being necessary to maintain a table of initial count values.

Priority management is therefore effected through an extremely simple calculation which very advantageously resolves the problems arising in the prior art.

In the embodiment of the invention described above, the low weight bits of the initial count values, that is to say those having a weight of less than m are also initialised to zero. There are therefore $2^{N-(L+M)}$ possible initial values because they have been selected from multiples of $2^{L+M}$.

However for security reasons it may be necessary to increase the number of possible initial count values in order to reduce the probability of selecting two identical numbers. In fact if the counter is a packet counter, it is possible to chose "th" and therefore M to be small, and therefore the number of initial values remain sufficiently high for random selection to be effective. On the other hand, if the counter is a data bit counter as in the TCP standard, "th" must be very much larger and this correspondingly restricts the number of initial count values.

By way of example, for packets of 1024 bits, which is a value very frequently found on the Internet, a connection is regarded as being long when it comprises more than 5 packets. For packet counting this means that M is selected to be equal to 2 or 3. But when transmitted data bits are counted M becomes 12 or 13.

In this latter case a variant embodiment of the invention comprises selecting a certain number of low weight bits in the initial sequence number. By choosing weights which are very much less than that of the predetermined threshold value, for example from the bits of lesser weight than the whole part of the base 2 logarithm of the maximum size for a data packet permitted on the network, only a minimum error in exceeding the predetermined threshold value for the corresponding connection is introduced. In fact, considering again the example of a data bit counter functioning for packets having more than 1024 data bits, if the bits of weight less than 10 are selected randomly, it is easy to see that the error introduced will not apply to more than one packet.

Thus the method according to the invention advantageously makes it possible to simplify the detection of connection sizes while maintaining random selection of the initial values.

In order to implement the method according to the invention the upstream equipment transmitting the packets, FIG. 5, comprises transmission means 8 for these packets connected to the network, such as, for example, an Ethernet network card. An information processing unit 9 is connected to these transmission means 8 and information storage means 10, such as for example volatile memory. An address in this memory acts as register 11 for counting the packets or bits transmitted. Information processing unit 9 comprises means 9*a* for initialising this register 11 at the start of the connection to an initial count value selected in the manner explained above. These initialisation means 9*a* also comprise means 9*d* for selecting the initial value from a set of predetermined values and means 9*e* for randomly selecting the low weight bits of this initial value. Information processing unit 9 also comprises means 9*b* for incrementing the contents of this register 11 whenever a new packet is transmitted, this increment being either one unit in the case of packet counting or the number of data bits transmitted in the packet. In the preferred embodiment of the invention these incrementing means 9*b* comprise means 9*f* for setting at least one bit in the field of L bits to the value 1. Information processing means 9 also comprises means 9*c* for copying the value of this register 11 to the field for the current count value in the packet header block.

The downstream equipment, FIG. 6, is a packet transmission system. It therefore comprises means 12 for receiving packets originating from the upstream equipment and means 13 for transmitting these packets to their final destination. These reception means 12 and transmission means 13 are connected to an information processing unit 14 which also comprises a table 15 of initial count values and means 14*a* for calculating the difference between the current count value of the packet and the initial value in the table immediately below it. This information processing unit 14 also comprises means 14b for comparing this difference with the predetermined threshold values th.

Of course those skilled in the art will be in a position to apply the invention to any network protocol without difficulty using packets numbered in transmission order.

The invention claimed is:

1. A method for the generation of data packets, by at least one upstream device for transmission over at least one network connection, the method comprising:
    at the start of a connection, initialization of a transmitted packets counter by the upstream device to an initial count value;
    incrementing the said counter by a specified value for each packet transmitted, to define a current count value of the packet; and
    generating a data packet including copying the current count value into the packet header of the generated data packet,
    wherein the initial count value is selected at the upstream device from a set of predetermined initial values such that the difference between any two consecutive initial values in the set is greater than a predetermined threshold used in a downstream device to prioritize packets.

2. A method according to claim 1, wherein when the current count value is presented in the binary form of a recording of N bits, the set of initial count values is such that a field of L bits of the count value, L always being less than N, is systematically initialized to zero, the field being positioned in such a way that when the number of transmitted packets reaches the predetermined threshold at least one bit in the field takes the numeric value 1.

3. A method according to claim 2, wherein when the field of L bits is positioned between a bit of rank M and a bit of rank M+L in the count value, the initial count values will be greater than $2^{<L+M>}$.

4. A method according to claim 3, wherein the predetermined threshold is equal to $2^M-1$.

5. A method according to claim 4, wherein the initial count values are multiples of $2^{<L+M>}$.

6. A method according to claim 4, wherein the bits of low weight in the initial count values are selected randomly from the bits of rank below T, T always being less than M.

7. A method according to claim 6, wherein the number of bits of low weight T is the whole part of the base 2 logarithm of the maximum packet size permitted on the network.

8. A system for generating data packets in an upstream device, said packets being destined for transmission via at least one connection established via a network, the system comprising:
    an information processing unit (9); and
    an information storage means (10) comprising at least one register (11) capable of storing a number of transmitted packets,
    the information processing unit comprising
    i) initialization means (9a) for initialising the register to an initial count value at the start of the connection,
    ii) incrementing means (9b) for incrementing the contents of the register whenever a new data packet is created, and
    iii) data packet generation means for generating a new data packet including copying means (9c) for copying the register contents into a current count value field in the packet header block of the new data packet,
    wherein the initialization means (9a) comprise selecting means (9d) for selecting the initial count value of at least one connection from a set of predetermined initial values such that the difference between any two consecutive initial values in that set is greater than a predetermined threshold used in a downstream device to prioritize packets.

9. A packet generating system according to claim 8, wherein when the current count value is in the binary form of a recording of N bits, the set of initial count values is such that a field of L bits of the count value, where L is always smaller than N, is systematically initialized to zero.

10. A packet generating system according to claim 9, wherein the incrementing means (9b) comprise means (9f) for setting at least one bit in the field of L bits to the value of L when the number of packets transmitted exceeds the predetermined threshold.

11. A system for the processing of data packets information of data packets received from at least one connection of a network comprising:
    receiving means (12) for receiving data packets originating from upstream device, each data packet having a current count value in its header block; and
    information processing means (14) for processing data packet information of the received data packets,
    wherein the information processing means (14) comprises i) a table (15) of initial count values, ii) means (14a) for calculating the difference between the current count value in the header of the received data packet and the initial value in the table immediately below that current count value, and iii) means (14b) for comparing this difference with a predetermined threshold, whereby the difference between any two consecutive initial values is greater than said predetermined threshold.

12. A packet processing system according to claim 11, wherein the means for calculating the difference and comparison with the predetermined threshold makes a comparison between a field of L bits of the current count value and zero.

13. A method for the selection by a downstream device (3a, 3b, 3c) of data packets, the data packets having being transmitted by an upstream device (1) over at least one network connection, the method comprising:
    reception by the downstream device (3a, 3b, 3c) of a IP packet of the connection;
    comparison by the downstream device (3a, 3b, 3c) of a predetermined threshold of the quantities of data transmitted through the connection, with the difference between the current count value in the header of the received packet and the immediately lower initial value in a set of predetermined initial values from which an initial count value is selected in the generation of the packets,
    whereby the difference between any two consecutive initial values is greater than said predetermined threshold; and
    selection of data packet by the downstream device according to the comparison.

14. A selection method according to claim 13, characterized in that the packets corresponding to the connections which have transmitted less data than the predetermined threshold are selected in preference to the packets corresponding to connections which have transmitted more data than the predetermined threshold.

* * * * *